United States Patent [19]
Hershey et al.

[11] Patent Number: 4,841,777
[45] Date of Patent: Jun. 27, 1989

[54] PRESSURE TRANSMITTER ASSEMBLY

[75] Inventors: George E. Hershey, Blue Bell; Charles E. Lane, III, Meadowbrook; Douglas W. Wilda, Ambler, all of Pa.

[73] Assignee: Honeywell Inc., Minneapolis, Minn.

[21] Appl. No.: 171,599

[22] Filed: Mar. 22, 1988

[51] Int. Cl.[4] .......................... G01L 7/08; G01L 9/06
[52] U.S. Cl. ....................................... 73/721; 73/706; 338/4; 338/42
[58] Field of Search ................. 73/716, 717, 718, 719, 73/720, 721, 722, 723, 724, 725, 726, 727, 728, 754, 756, DIG. 4, 706, 708; 338/4, 42

[56] References Cited
U.S. PATENT DOCUMENTS 4,342,231  8/1982  Yamamoto et al. ................ 73/721
4,546,651 10/1985  Tobita et al. ..................... 73/720
4,612,227  9/1986  Lam et al. ........................ 73/756

Primary Examiner—Donald O. Woodiel
Attorney, Agent, or Firm—Mitchell J. Halista; Albin Medved

[57] ABSTRACT

A pressure transmitter assembly includes a laminated ceramic structure for providing fluid passages as well as a support for a pressure sensor, electronic circuitry, fluid barrier diaphragms and input process fluid connections. The laminated structure is comprised of a plurality of co-fired ceramic layers having the fluid passages molded therein to enable fill fluids within the assembly to apply input pressures as a differential pressure across the pressure sensor. In one embodiment of the invention, three ceramic layers are used while a second embodiment uses four layers with an overload diaphragm captured between two of the layers. The laminated ceramic structure can be extended in either embodiment to include an outer ceramic circuit board which is bonded with a fluid-tight interface with an adjacent one of the other ceramic layers. Electronic components are mounted on the circuit board, either before or after bonding, which also provides a capability for further fluid passages extending between the circuit board and an adjacent ceramic layer.

20 Claims, 3 Drawing Sheets 4,841,777

PRESSURE TRANSMITTER ASSEMBLY

BACKGROUND OF THE INVENTION

Field of the Invention

The present invention relates to fluid pressure transmitters. More specifically, the present invention is directed to a structure for a fluid pressure transmitter.

SUMMARY OF THE INVENTION

An object of the present invention is to provide an improved fluid pressure transmitter including a plurality of contiguous ceramic layers providing fluid passages therethrough while affording a support for fluid barrier diaphragms located between the fluid passages and externally applied first and second pressure input fluids representative first and second fluid pressures, respectively, and a pressure responsive sensor supported by the ceramic layers and exposed to the first and second fluid pressures through the fluid passages in the ceramic layers.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
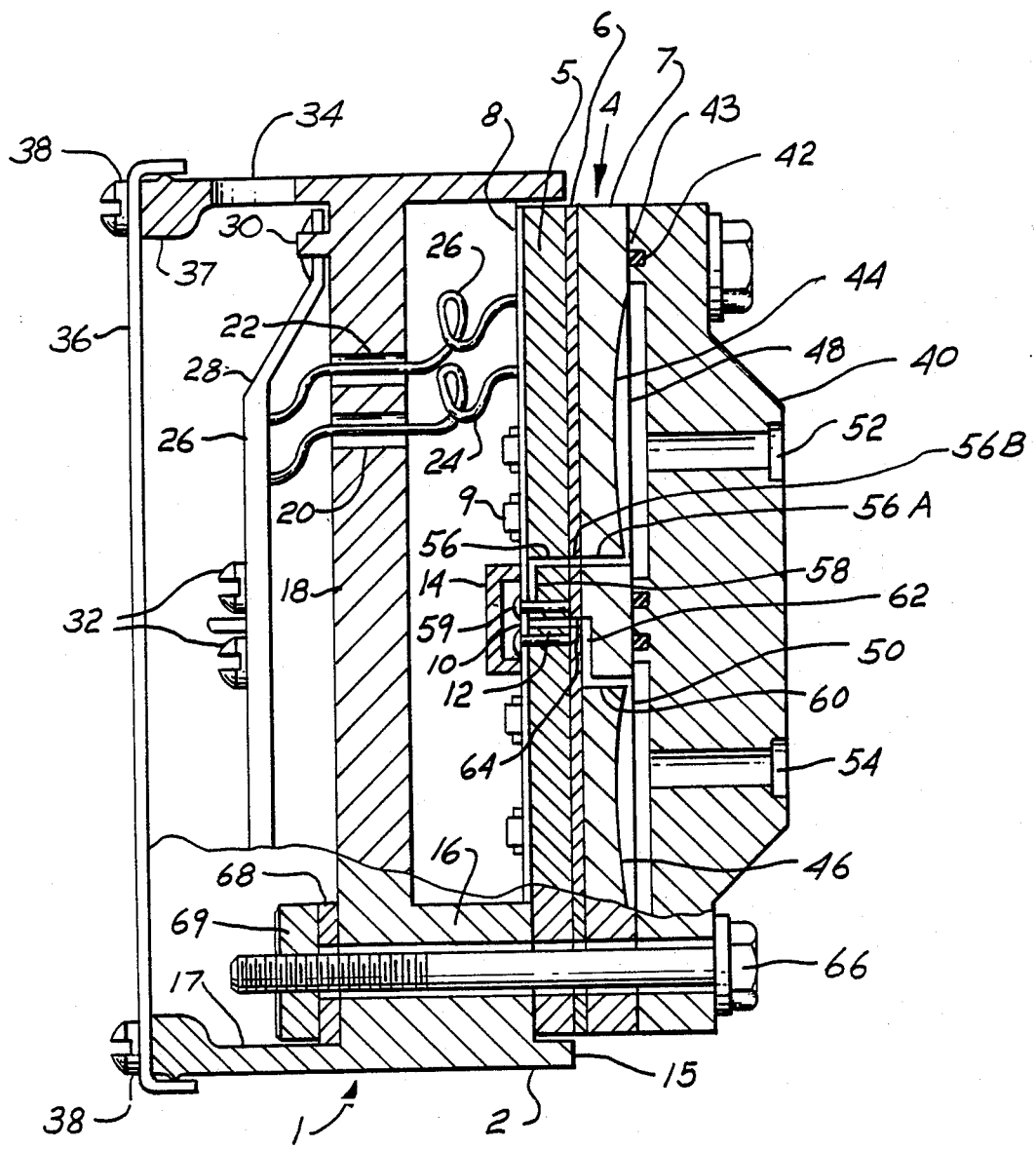
FIG. 1 is a cross-sectional illustration of a pressure transmitter assembly embodying a first example of the present invention.

Referring to FIG. 1 in more detail, there is shown a first example of a pressure transmitter embodying the present invention and having a housing assembly 1 including a shell 2 arranged to provide a support for a layered ceramic assembly identified as a meter body 4. The ceramic meter body 4 is shown in FIG. 1 as including three ceramic layers 5,6,7 which are arranged to provide respective functions. An innermost first layer 5 is arranged to support an electronic circuit board which may advantageously be in the form of a fourth ceramic layer 8 having surface mount electronic components 9 mounted thereon. The circuit board layer 8 may be attached to the adjacent first meter body layer 5 by any suitable means to provide a fluid-tight interface therewith, e.g., epoxy bonding. On the other hand, the circuit board layer 8 may also be bonded to the layer 5 by a co-firing process used to bond to the layers 5,6,7 as discussed hereinafter. In such a bonding procedure, the layer 8 would be included in the co-firing process, and the electronic components 9 would subsequently be mounted on the layer 8. The layer 8 in either case provides a capability for fluid passages extending between the layer 8 and the adjacent ceramic layer 5. The innermost layer 5 also provides fluid passages and a support for a pressure sensor 10 attached with a fluid-tight connection across an outer end of a tube 12 passing through the layer 5. The sensor 10 may be any suitable well-known transducer, e.g., a piezoresistive type, which have found widespread use in pressure sensing. Electrical connections to the sensor 10 can be provided by any suitable well-known means, such connections have been omitted from the illustration for the sake of clarity.

A cap 14 is arranged across the transducer 10 to provide a fluid volume thereacross and is attached, e.g., soldered, epoxy bonded, etc., to the circuit board 8 to provide a fluid-tight seal for retaining a fluid within the cap 14. The layered assembly 5, 6, 7 and 8 is arranged within a first open end 15 of the shell 2 to rest on an internal annular step 16 extending inwardly from an inner wall 17 within the shell 2. The step 16 longitudinally terminates at a transverse internal divider 18 within the shell 2. The divider 18 is provided with a pair of parallel holes 20,22 to allow passage of electrical connecting wires 24,26, respectively, to pass through the divider 18. The wires 24,26 are used to provide electrical connections to the printed circuit board 8. A terminal block 28 is located on the other side of the divider 18 from the printed circuit board 8 and is attached by any suitable means to the divider 18, e.g., integral studs 30 extending outwardly from the divider 18. The terminal board 28 provides a mounting means for screw-type terminals 32 thereof for enabling external wiring connecting the pressure transmitter to associated equipment to be connected to the connecting wires 24,26. An opening 34 is provided through the shell 2 adjacent to the terminals 32 and may be used for attaching an electrical wire conduit or similar fitting to the shell 1. A cover 36 is attached across a second open end 37 of the shell 1 by screws 38 to provide protection for the wiring and terminals 32 within the shell 2.

A so-called process head 40 is arranged across the meter body 4 and is sealed thereto by any suitable means, e.g., seal rings 42 projecting from respective annular recesses 43 in the head 40 and contacting the outermost layer 7. The outermost layer 7 of the meter body 4 is provided with two concave surfaces 44,46 radially displaced on respective sides of a transverse axis of the layer 7. A first barrier diaphragm 48 is located across a first concave surface 44 and a second barrier diaphragm 50 is located across a second concave surface 46. The peripheral edges of the diaphragms 48 and 50 are captured between the outer layer 7 and the process head 40 to provide a fluid-tight seal therebetween which may be aided by the seal rings 42. A first process fluid inlet conduit 52 is provided through the process head 40 to enable a first input fluid, e.g., a high pressure fluid, to be applied to one side of the first diaphragm 48. A second process fluid inlet conduit 54 is provided through the process head 40 and is radiallyced from the first opening 52 and is used to provide a fluid passage to one side of the second diaphragm 50 for a second process fluid, e.g., a low pressure fluid.

The layers 5,6,7,8 of the process head 40 are provided with fluid passages either extending through a layer or along a surface of a layer to provide fluid channels for so-called fill fluids which are used within the transmitter assembly to transmit fluid pressures from the diaphragms 48,50 to the sensor 10. Specifically, a first fill fluid transmits a fluid pressure from the first diaphragm 48 to one side of the sensor 10, and a second fill fluid transmits a fluid pressure from the second diaphragm 50 to the other, or second, side of the sensor 10. The two fill fluids are isolated from each other and are disposed in respective fluid passages extending between the diaphragms 48,50 and the sensor 10. Thus, a first fluid duct 56 is provided through the layers of the meter body 4 to provide a fluid passage from the other side of the first diaphragm 48 from the first input conduit 52 to the underside of the printed circuit board 8. Specifically, the fluid duct 56 includes a serial arrangement of a first hole 56A through the outer layer 7, a second hole 56B through the middle layer 6 and a third hole 56C through the inner layer 5. The holes 56 and 56A,B are axially aligned and are formed within the layers 5,6,7 by any suitable technique, e.g., molding, prior to the co-firing of the layers 5,6,7 to produce the fluid-tight ceramic meter body 4. The third hole 56 terminates in a first longitudinal groove 58 on an outer surface of the inner layer 5 and under the circuit board layer 8 to connect the first duct 56 to a fluid passage 59 provided along the side of the tube 12 and extending into the volume defined by the cover 14 above the transducer 10. Thus, a fluid passage is established from the inside surface of the first diaphragm 48 through the layers 5,6,7,8 of the meter body 4 to one side of the sensor 10. This fluid passage is filled with a first fill fluid.

A third fluid duct 60 defined by a hole through the layer 7 is provided from the other side of the second diaphragm 50 from the second input fluid conduit 54 through the layer 7 of the meter body 4. The third duct 60 terminates in a second longitudinal groove 62 on a surface of the layer 7 facing the center layer 6. The second groove 62 is arranged to connect the third fluid duct 60 to a fourth fluid duct 64 defined by a hole extending through the center layer 6 of the meter body 4 axially aligned with the central bore of the tube 12 supporting the sensor 10. Thus, a fluid passage is established from the inside surface of the second diaphragm 48 through the second and third layers 6,7 of the meter body 4 to the other side of the sensor 10. This latter fluid passage is filled with a second fill fluid. The volumes defined between the first and second diaphragms 48,50 and the first and second concave surfaces 44,46 as well as the internal volume defined by the cup 14 or the internal bore of the tube 12 are also filled with respective ones of the first and second fill fluids for the purpose of transmitting movements of the diaphragms 44,48 to the sensor 10.

The process head 40 and the meter body 4 are attached to the step 16 of the shell 2 by any suitable means such as bolts 66 passing through the process head 40 and the meter body 4 and through the step 16 and the divider 18. A threaded inner end of each of the bolts 66 which emerge on the other side of the divider 18 from the meter body 4 is secured to the divider 18 by lockwasher 68 and nut 70. Thus, the assembly is rigidly assembled into a cohesve pressure transmitter for subsequent mounting and connection to process fluids via the input conduits 52,54.

The internal fluid passages within the meter body 4 as well as the fill fluid volumes provided by the concave surfaces 44,46 for accommodating movements of the diaphragms 48,50 are preferably molded into the ceramic layer elements 5,6,7 prior to a firing of these elements A subsequent co-firing of the ceramic layers produces a fluid tight meter body assembly 4 which is advantageously incorporated as described above to provide a pressure transmitter using the sensor 10 and the electronics on the printed circuit board 8 to provide electrical signal representative of sensed differential pressures. The various fluid-tight connections external of the meter body 4 may be established.by soldering or epoxy bonding to form the pressure containment particularly for the high pressure side of the fill fluid, e.g., the attachment of the cup 14.

Figure 2:
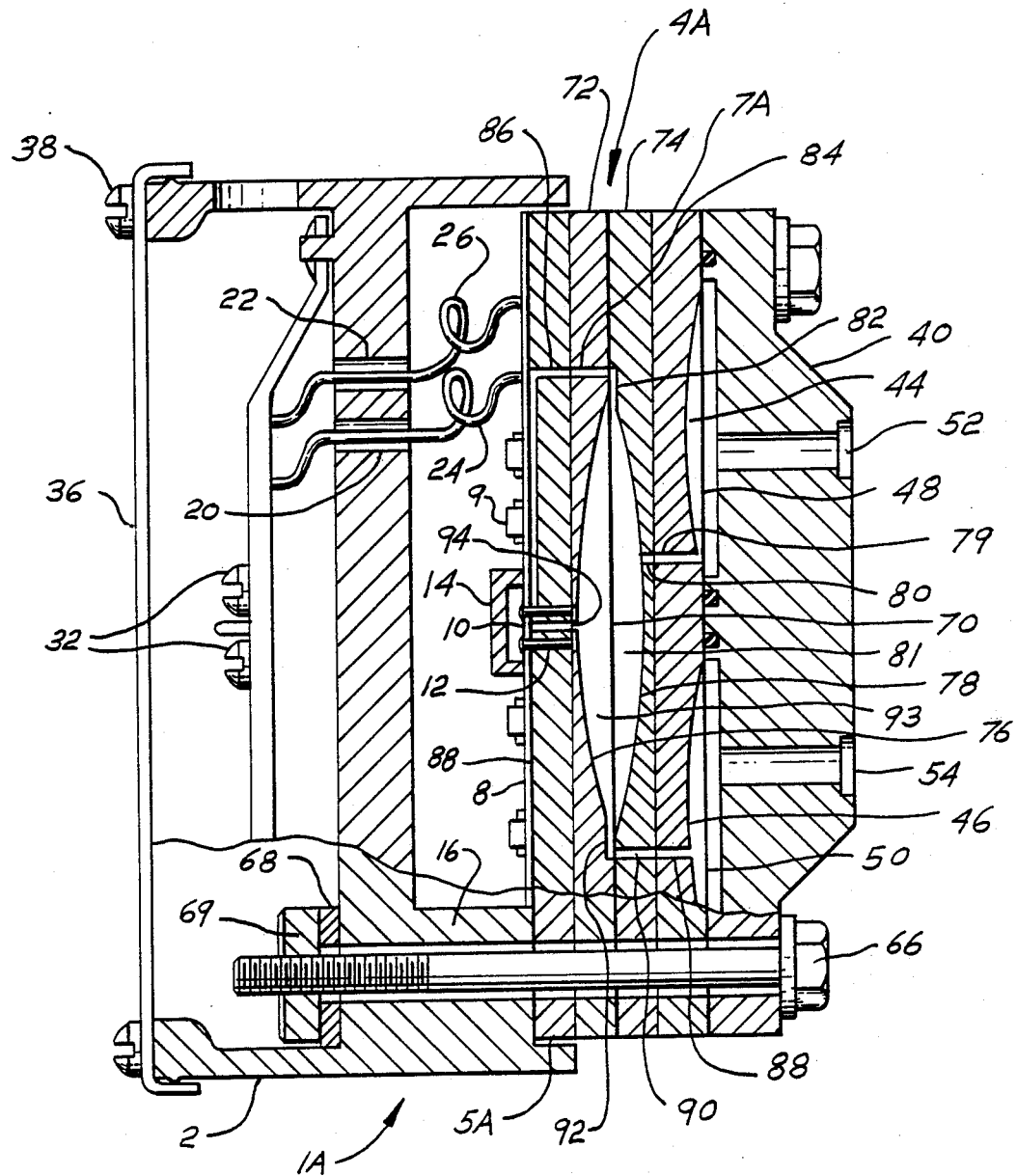
FIG. 2 is a cross-sectional illustration of a pressure transmitter assembly embodying a second example of the present invention and FIG. 3 is a cross-sectional illustration of a fluid pressure transmitter assembly embodying a third example of the present invention.

In FIG. 2, there is shown a second embodiment of the present invention including four ceramic layers and a circuit board layer 5 forming a meter body 4A forming a housing for a so-called overload diaphragm 70 captured between a second and a third layer 72 and-74 for protecting the sensor 10 from an excessive input pressure. Adjacent concave surfaces 76,78 are provided in the second and third layers 72,74 respectively, facing the diaphragm 70 to provide corresponding internal fill fluid volumes for accommodating an overload, i.e., abnormal, pressure induced movement of the diaphragm 70. A first fluid duct 79 is provided by a hole through a fourth outer layer 7A to provide a fluid passage from the volume defined between the first diaphragm 48 and the adjacent concave surface 44 in outer layer 7A to a second fluid duct 80 defined by a hole through the third layer 74. The second duct 80 is axially aligned with the first duct 79 and terminates at a first concave surface 78 in the third layer 74 to provide a fluid passage to a volume 81 defined between the first concave surface 78 and the overload diaphragm 70. A first longitudinal groove 82 is provided in a surface of a third layer 74 extending from a peripheral edge of the concave surface 78 to a point beyond the peripheral edge of the overload diaphragm 70. A third duct 84 is provided by a hole through the second layer 72 between the outer end of the first groove 82 and a fourth duct 86 extending through a first layer 5A and axially aligned with the third duct 84. The fourth duct 86 terminates at one end of a second groove 88 in an outer surface of the first layer 5A beneath the circuit board 8. The second groove 88 extends between the fourth duct 86 and the fluid passage provided along the tube 12. Thus, a fluid passage is provided between the volume defined between the diaphragm 48 and the concave surface 44, the volume 81, the volume defined beneath the cup 14 and one said of the sensor 10.

A fifth fluid duct 89 is provided by a hole through the outermost layer 7A of the meter body 4A to connect the volume defined between the concave surface 46 and the diaphragm 50 to a sixth fluid duct 90 extending through the third layer 74 and located beyond the peripheral edge of the overload diaphragm 70 to a third groove 92 on the surface of the second layer 74. The third groove 92 terminates on the other side of the overload diaphragm 70 from the volume 81, i.e., within a volume 93 defined between the overload diaphragm 70 and the concave surface 76. The volume 93 is provided with an exit hole 94 on the concave surface 76 axially aligned with the center bore of the tube 12. Thus, a fluid path from the volume defined beneath the first diaphragm 48 is provided through the fluid passages 79,80 to one side of the overload diaphragm 70 and through the fluid passages 82, 84, 86 and 88 to one side of the sensor 10. Similarly, a fluid path from the volume defined beneath the second diaphragm 50 is provided through fluid passages 89, 90 and 92 to the other side of the overload diaphragm 70 and through the exit hole 94 and the center bore of the tube 12 to the other side of the sensor 10. Respective fill fluids are provided to fill the aforesaid fluid paths as described above with respect to FIG. 1 whereby fluid pressures from the barrier diaphragms 48,50 are communicated to respective sides of the overload diaphragm 70 and respective sides of the sensor 10. The remaining elements of the transmitter shown in FIG. 2 are similar to those previously described with respect to FIG. 1 and similar reference numbers have been used in FIG. 2.

Figure 3:
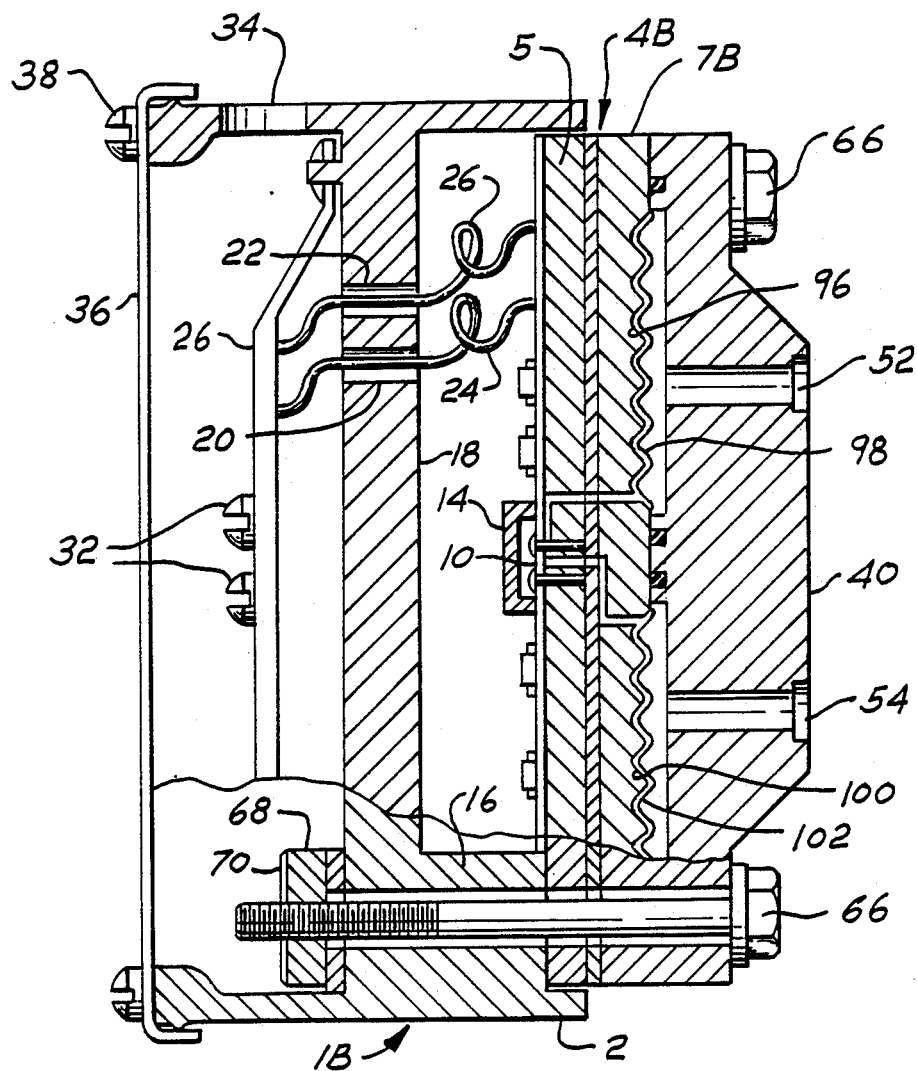

In FIG. 3, there is shown a third embodiment of the present invention having a housing assembly 1B wherein the concave surfaces 44 and 46 described above with respect to the embodiment shown in FIG. 1 are replaced by respective convoluted surfaces in an outermost layer 7B of a meter body 4B while the diaphragms 48,50 are replaced by convoluted barrier diaphragms. Specifically, a first convoluted surface 96 replaces concave surface 44, while a first convoluted diaphragm 98 replaces the diaphragm 48. Similarly, a second convoluted surface 100 replaces surface 46 and a second convoluted diaphragm 102 replaces the diaphragm 50. The convoluted barrier diaphragms 98 and 102 are arranged to match the convolutions in the adjacent surfaces 96,100 whereby the surfaces 96,100 provide a backup for the barrier diaphragms 98,102 as an overload mechanism. The remaining elements of the pressure transmitter shown in FIG. 3 are similar to those described above with respect with respect to FIG. 1 and similar reference numbers have been used in FIG. 3. Further, the ceramic meter bodies 4A,4B shown in FIGS. 2 and 3 are preferably prepared in a manner similar to that previously described with respect to FIG. 1 utilizing molding and co-firing of the ceramic layers.

Accordingly, it may be seen that there has been provided, in accordance with the present invention an improved pressure transmitter.

The embodiments of the present invention in which an exclusive property or privilege is claimed are defined as follows:

1. A pressure transmitter comprising
   a pressure sensor means for providing an output signal representative of a differential pressure applied thereacross,
   a first diaphragm means for developing a first fluid pressure representative of a first input pressure applied thereto,
   a second diaphragm means for developing a second fluid pressure representative of a second input pressure applied thereto and
   multilayer ceramic means including a plurality of contiguous ceramic layers between said first and second diaphragm means and said sensor means for directing said first and second fluid pressures to said sensor means as a differential pressure thereacross.

2. A pressure transmitter as set forth in claim 1 wherein said sensor means includes a pressure sensor and mounting means for attaching said sensor to said ceramic means to receive said first and second fluid pressures.

3. A pressure transmitter as set forth in claim 1 wherein said ceramic means includes three co-fired ceramic layers having pre-firing fluid passages molded therein.

4. A pressure transmitter as set forth in claim 3 wherein said fluid passages include holes through said layers and grooves on surfaces of said layers.

5. A pressure transmitter as set forth in claim 1 wherein said multilayer ceramic means includes a pair of concave surfaces forming respective fill fluid volumes with respective ones of said first and second diaphragm means.

6. A pressure transmitter as set forth in claim 5 wherein said concave surfaces have a surface configuration matched by said first and second diaphragm means.

7. A pressure transmitter as set forth in claim 6 wherein said surface configuration is smooth.

8. A pressure transmitter as set forth in claim 6 wherein said surface configuration is convoluted.

9. A pressure transmitter as set forth in claim 1 wherein said ceramic means includes four co-fired ceramic layers having pre-firing passages and a pair of facing concave surfaces molded therein and an overload diaphragm captured between said concave surfaces to provide a fluid-tight barrier therebetween.

10. A pressure transmitter as set forth in claim 9 wherein said fluid passages include holes through said layers and grooves on surfaces of said layers.

11. A pressure transmitter as set forth in claim 9 wherein said ceramic means includes a second pair of concave surfaces forming respective fill fluid volumes with respective ones of said first and second diaphragm means.

12. A pressure transmitter as set forth in claim 11 wherein said second pair of concave surfaces have a surface configuration matched by said first and second diaphragm means.

13. A pressure transmitter as set forth in claim 3 wherein said ceramic means includes a ceramic circuit board means having a fluid-tight bond to an outer one of said three layers.

14. A pressure transmitter as set forth in claim 9 wherein said ceramic means includes a ceramic circuit board means having a fluid-tight bond to an outer one of said four layers.

15. A pressure transmitter as set forth in claim 1 wherein said first diaphragm means includes a first diaphragm and first means for sealing said first diaphragm to said ceramic means and said second diaphragm means includes a second diaphragm and second means for sealing said second diaphragm to said ceramic means.

16. A pressure transmitter a set forth in claim 15 wherein said multilayer ceramic means includes a pair of concave surfaces forming respective fill fluid volumes with respective ones of said first and second diaphragms.

17. A pressure transmitter as set forth in claim 1 wherein said ceramic means includes a ceramic circuit board means having a fluid-tight bond to an outer one of said ceramic layers.

18. A pressure transmitter as set forth in claim 17 wherein said sensor means includes a pressure sensor and mounting means for attaching said sensor to said circuit board to receive said first and second fluid pressures.

19. A pressure transmitter as set forth in claim 18 wherein said circuit board includes fluid passages therein to transmit said first and second fluid pressures to said sensor.

20. A pressure transmitter as set forth in claim 1 wherein said ceramic layers have fluid passages including holes through said layers and grooves on surfaces of said layer molded therein.

* * * * *